(12) United States Patent
Graber et al.

(10) Patent No.: US 8,490,682 B2
(45) Date of Patent: Jul. 23, 2013

(54) SUCTION FILTER DESIGN FOR FLUID THAWING

(75) Inventors: Julie A. Graber, Fostoria, OH (US); Patrick Keenan, Bowling Green, OH (US); Christophe Henry, Langolen (FR)

(73) Assignee: Kuss Filtration Inc., Findlay, OH (US)

( * ) Notice: Subject to any disclaimer, the term of this patent is extended or adjusted under 35 U.S.C. 154(b) by 419 days.

(21) Appl. No.: 12/781,293

(22) Filed: May 17, 2010

(65) Prior Publication Data

US 2010/0294464 A1 Nov. 25, 2010

Related U.S. Application Data

(60) Provisional application No. 61/179,883, filed on May 20, 2009.

(51) Int. Cl.
| | |
|---|---|
| *F28D 15/00* | (2006.01) |
| *B01D 24/00* | (2006.01) |
| *B01D 29/00* | (2006.01) |
| *B01D 35/18* | (2006.01) |

(52) U.S. Cl.
USPC .............. 165/104.19; 210/185; 210/184

(58) Field of Classification Search
USPC .............. 210/416.1, 184, 185, 175, 484, 485, 210/323.2, 416.4, 486, 497.01, 499, 774, 210/287, 435, 767, 805, 385.3, 172; 165/104.19
See application file for complete search history.

(56) References Cited

U.S. PATENT DOCUMENTS

| | | | |
|---|---|---|---|
| 3,826,372 A | | 7/1974 | Bell |
| 4,510,051 A | * | 4/1985 | Diry ................................ 210/94 |
| 4,581,903 A | | 4/1986 | Kerry |
| 4,600,825 A | * | 7/1986 | Blazejovsky ................. 219/205 |
| 4,617,121 A | | 10/1986 | Yokoyama |
| 4,853,123 A | | 8/1989 | Hayes et al. |
| 4,976,852 A | * | 12/1990 | Janik et al. ...................... 210/86 |
| 5,049,271 A | | 9/1991 | Cain |

(Continued)

FOREIGN PATENT DOCUMENTS

| | | | |
|---|---|---|---|
| WO | WO 0054866 A1 | * | 9/2000 |
| WO | WO 2007068303 A1 | * | 6/2007 |

OTHER PUBLICATIONS

Sherman, "Plastics that conduct heat," Plastics Technology; Jun. 2001, 52-57.*

(Continued)

*Primary Examiner* — Ling Choi
*Assistant Examiner* — Catherine S Branch
(74) *Attorney, Agent, or Firm* — Brinks Hofer Gilson & Lione

(57) ABSTRACT

A suction filter providing a heat transfer pathway therein is provided. The suction filter includes a support structure, an inlet connected to the support structure, a filter element connected to the support structure, and a thermally conductive element that communicates with an interior portion of the suction filter. The filter element is configured to filter a fluid as it passes through the filter element into an interior portion of the suction filter. Also, the thermally conductive element extends from the interior portion of the suction filter to an exterior portion of the suction filter. The thermally conductive element is configured to transfer heat obtained external the suction filter to the interior portion of the suction filter in order to provide heat to the fluid in the interior portion of the suction filter.

17 Claims, 6 Drawing Sheets

U.S. PATENT DOCUMENTS

| | | | |
|---|---|---|---|
| 5,055,187 | A | 10/1991 | Ito et al. |
| 5,071,546 | A | 12/1991 | Ruegg |
| 5,174,841 | A | 12/1992 | Combest |
| 5,547,568 | A | 8/1996 | Sasaki |
| 5,571,298 | A | 11/1996 | Buck |
| 5,665,229 | A | 9/1997 | Fitzpatrick et al. |
| 5,716,522 | A | 2/1998 | Chilton et al. |
| 5,902,480 | A | 5/1999 | Chilton et al. |
| 6,493,508 | B1 | 12/2002 | Roesgen |
| 2004/0035842 | A1* | 2/2004 | Cheng et al. .................. 219/212 |
| 2009/0084736 | A1 | 4/2009 | Rocheux et al. |

OTHER PUBLICATIONS

International Search Report for international patent application No. PCT/US2010/035201, dated Jan. 3, 2011 (3 pages).

Written Opinion of the International Searching Authority for international patent application No. PCT/US2010/035201, dated Jan. 3, 2011 (4 pages).

* cited by examiner

SUCTION FILTER DESIGN FOR FLUID THAWING

The present application claims the benefit of U.S. Provisional Patent Application Ser. No. 61/179883, entitled "SUCTION FILTER DESIGN FOR FLUID THAWING," filed on May 20, 2009, and which is incorporated herewith by reference in its entirety.

FIELD

A filter for use within a fuel tank is disclosed that provides an improved structure for providing a heat transfer pathway to the inside of the filter.

BACKGROUND

Conventional suction filters with depth filter media for use inside a fuel tank have shown to be problematic when the fluid inside the filter freezes. Particularly in urea fuel tanks, the use of depth filter media in conventional suction filters have been found to act as an insulator to the fluid (i.e., urea) inside the suction filter, thereby preventing heat from transferring to the inside of the suction filter even if an active heating unit is installed within the fuel tank. This can be problematic as urea freezes at relatively high temperatures and thus requires a heating system to thaw the urea prior to the urea being drawn from the fuel tank into a fuel pump. Accordingly, a fuel pump drawing urea from the conventional depth filter media suction filter will not have thawed urea to draw from.

SUMMARY

The following technical disclosure describes an improved filter design for fluid thawing by providing heat into the interior of the filter. The technical disclosure can be applied to a variety of different filters including, for example, suction filters and the like.

In some embodiments, an improved suction filter design that provides heat into the interior of a depth filter media of the suction filter is provided. In other embodiments, an improved suction filter design that provides heat into the interior of the suction filter that uses a surface media. The heat provided in the interior of the filter can be used to heat many types of fluids that can be located within the interior of the filter including, for example, water and urea.

In one embodiment, a suction filter providing a heat transfer pathway therein is provided. The filter includes a support structure, an inlet and a filter media. The inlet is connected to the support structure and configured to connect to a fuel pump. The filter media is also connected to the support structure and filters a fluid as it passes through the filter media into an interior portion of the suction filter. An inside surface of the support structure defines the interior portion of the suction filter and the support structure is configured to allow a thermally conductive element to enter the interior portion. The thermally conductive element transfers heat obtained external the suction filter to the interior portion of the suction filter in order to provide heat to the fluid in the interior portion of the suction filter.

In another embodiment, a suction filter providing a heat transfer pathway therein is provided. The suction filter includes a support structure, an inlet connected to the support structure and configured to connect to a fuel pump, a filter media connected to the support structure that filters a fluid as it passes through the filter media into an interior portion of the suction filter, and a thermally conductive element that communicates with an interior portion of the suction filter and an exterior portion of the suction filter. The filter media is configured to filter a fluid as it passes through the filter element into an interior portion of the suction filter. Also, thermally conductive element transfers heat obtained external the suction filter to the interior portion of the suction filter in order to provide heat to the fluid in the interior portion of the suction filter.

In yet another embodiment, a method for providing heat to a fluid contained within an interior portion of a suction filter is provided. The method includes heating an exterior portion of a thermally conductive element. The exterior portion of the thermally conductive element is located at an exterior portion of the suction filter. The method also includes transferring heat from the exterior portion of the thermally conductive element to an interior portion of the thermally conductive element located in the interior portion of the suction filter. The method further includes the heat transferred to the interior portion of the thermally conductive element providing heat to the interior portion of the suction filter.

In one embodiment, the thermally conductive element is part of the support structure of the suction filter. In another embodiment, the thermally conductive element is not part of suction filter.

In one embodiment, the thermally conductive element is also connected to the filter media.

In one embodiment, the filter includes an interior cavity and openings at opposing ends of the suction filter for allowing a heating unit to pass therein.

In one embodiment, the filter includes an interior portion and openings at opposing ends of the filter for allowing the thermally conductive element to enter and exit the interior portion of the filter. In another embodiment, the suction filter includes an opening only at one of the opposing ends of the filter that allows the thermally conductive element to enter the interior portion of the filter.

DETAILED DESCRIPTION

The suction filters described herein can generally provide an improved structure for providing a heat transfer pathway to the inside of the filter. The embodiments discussed herein are directed to a depth media suction filter for use inside a urea fuel tank. However, the improvements described herein may be also used for suction filters using a surface media and may be used to provide heat inside the suction filter for heating other types of fluids besides urea.

Figure 1:
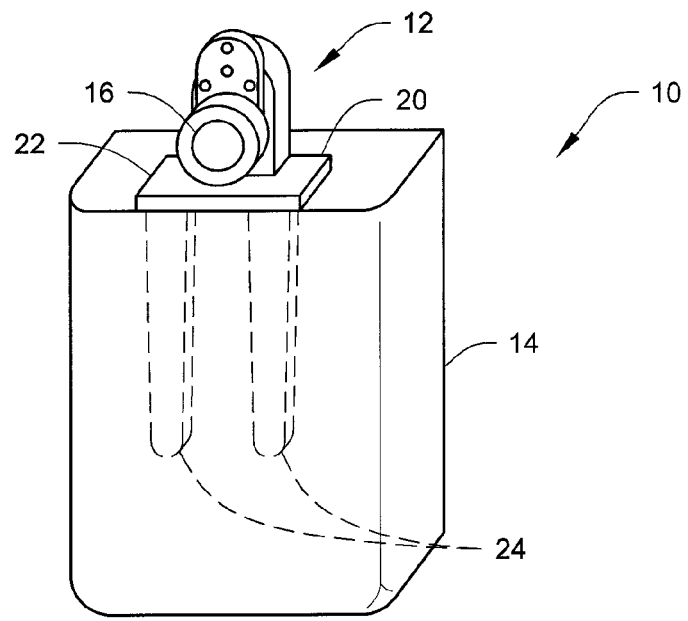
FIG. 1 illustrates a perspective view of a suction filter providing a heat transfer pathway therein, according to one embodiment.

FIG. 1 illustrates a perspective view of one embodiment of a suction filter 10 providing a heat transfer pathway therein. The suction filter 10 includes a support structure 12 surrounded by depth filter media 14. The support structure 12 includes an inlet 16 and a thermally conductive element 20. The inlet 16 is configured to connect to a fuel pump and allow the fuel pump to draw filtered urea from an interior cavity (not shown) of the suction filter 10. The thermally conductive element 20 includes an exterior appendage portion 22 connected to a plurality of interior rib portions 24.

Figure 2:
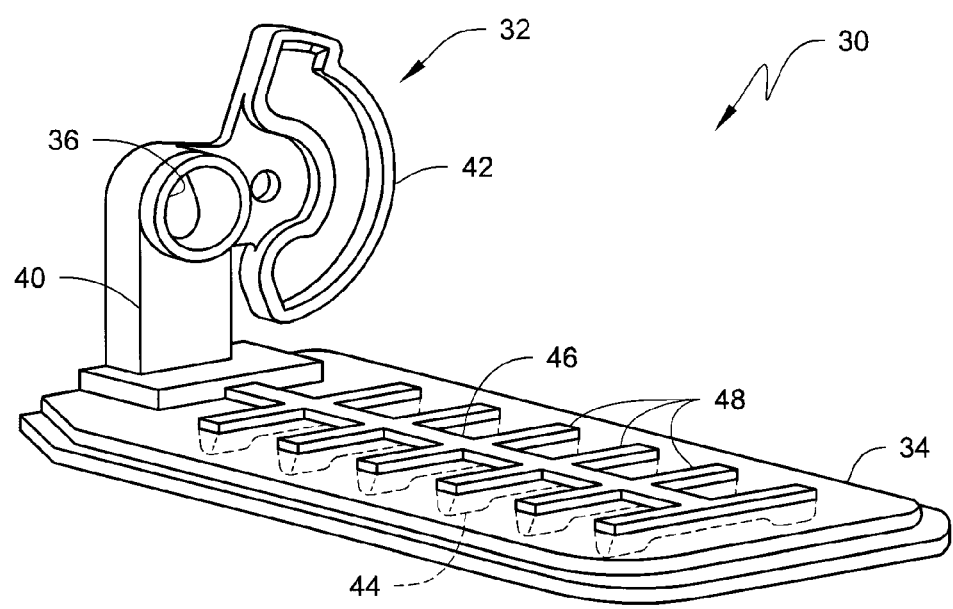
FIG. 2 illustrates a partial perspective view of one side of an embodiment of a suction filter providing a heat transfer pathway therein, according to another embodiment.

FIG. 2 illustrates a partial interior view of another embodiment of a suction filter 30 providing a heat transfer pathway therein. The suction filter 30 includes a support structure 32 molded to depth filter media 34. The support structure 32 includes an inlet 36 and a thermally conductive element 40. The thermally conductive element 40 includes an exterior appendage portion 42 connected to an interior rib portion 44. The exterior appendage portion 42 is integrally formed with the inlet 36. The rib portion 44 and a portion of the appendage portion 42 are molded to an interior portion of the depth filter media 34.

The interior rib portion 44 includes a spine 46 extending along the length of the depth filter media 34 and a plurality of ribs 48 extending perpendicularly from the spine 46. The positioning of the spine 46 and the ribs 48 allow the interior rib portion 44 to provide heat to a substantial portion of the interior of the suction filter 30.

Figure 3:
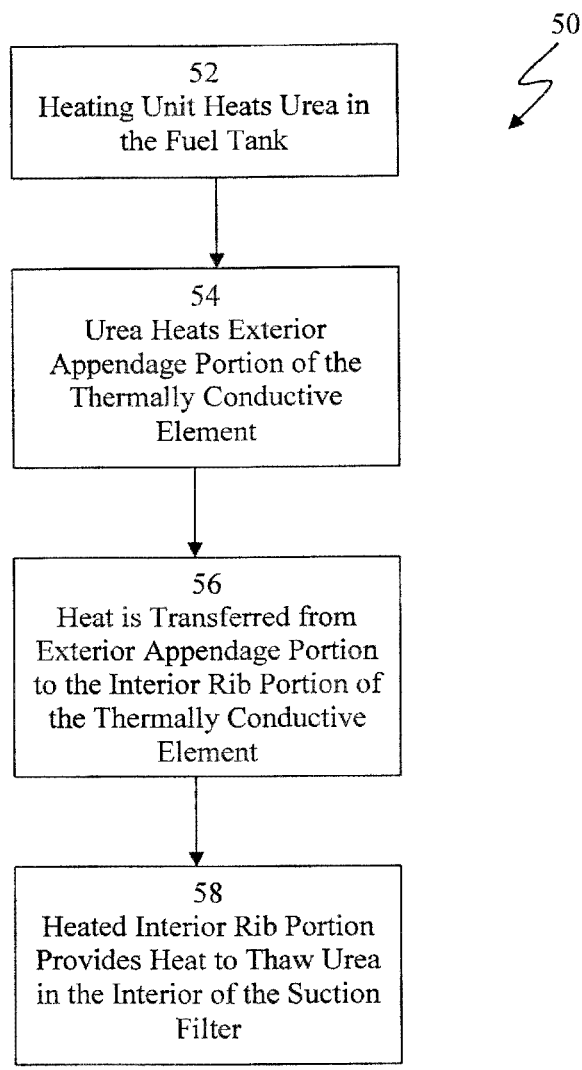
FIG. 3 illustrates a flow chart of how a suction filter thermally transfers heat from outside the suction filter to the interior of the suction filter, according to one embodiment.

FIG. 3 illustrates a flow chart 50 of one embodiment of how a suction filter similar to the suction filter 10 shown in FIG. 1 and the suction filter 30 shown in FIG. 2 thermally transfers heat from outside the suction filter to the interior of the suction filter. The flowchart 50 begins at step 52 whereby a heating unit located inside the fuel tank in which the suction filter is located, is used to heat the urea stored in the fuel tank.

At step 54, the heat from the heated urea stored in the fuel tank is transferred to the exterior appendage of the thermally conductive element.

At step 56, the heat from the exterior appendage portion of the thermally conductive element is transferred to the interior rib portion of the thermally conductive element.

At step 58, heat transferred to the interior rib portion of the thermally conductive element is now able to thaw urea located in the interior of the suction filter.

Figure 4:
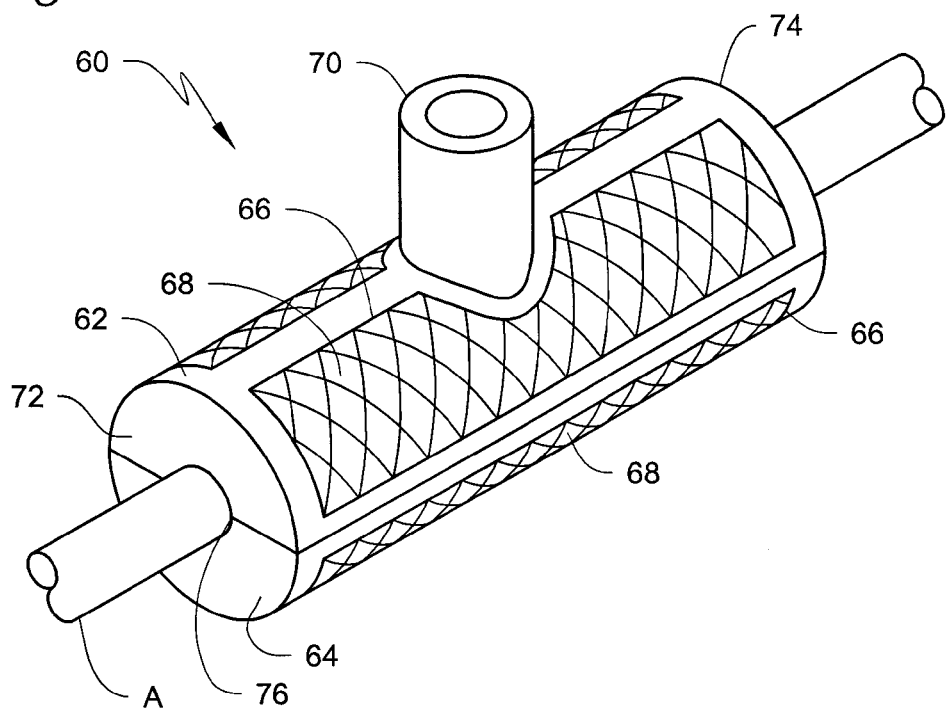
FIG. 4 illustrates a perspective view of a suction filter in a closed position that provides a heat transfer pathway therein, according to another embodiment.

FIG. 4 illustrates a perspective view of another embodiment of a suction filter 60 providing a heat transfer pathway therein. The suction filter 60 includes a first housing portion 62 attached to a second housing portion 64. The first housing portion 62 and the second housing portion 64 include openings 66 covered with depth filter media 68. The first housing portion 62 also includes an inlet 70. The first housing portion 62 and the second housing portion 64 together define a support structure of the suction filter 60.

The suction filter 60 has a first end 72 and a second end 74. Both the first end 72 and the second end 74 include openings 76 that allow a heater unit A to pass through an interior cavity 78 (shown in FIGS. 5 and 6) of the suction filter 60. The interior cavity 78 is configured for storing fluid filtered by the depth filter media 68 and to provide a passageway for allowing the heater unit A to pass through the suction filter 60.

Figure 5:
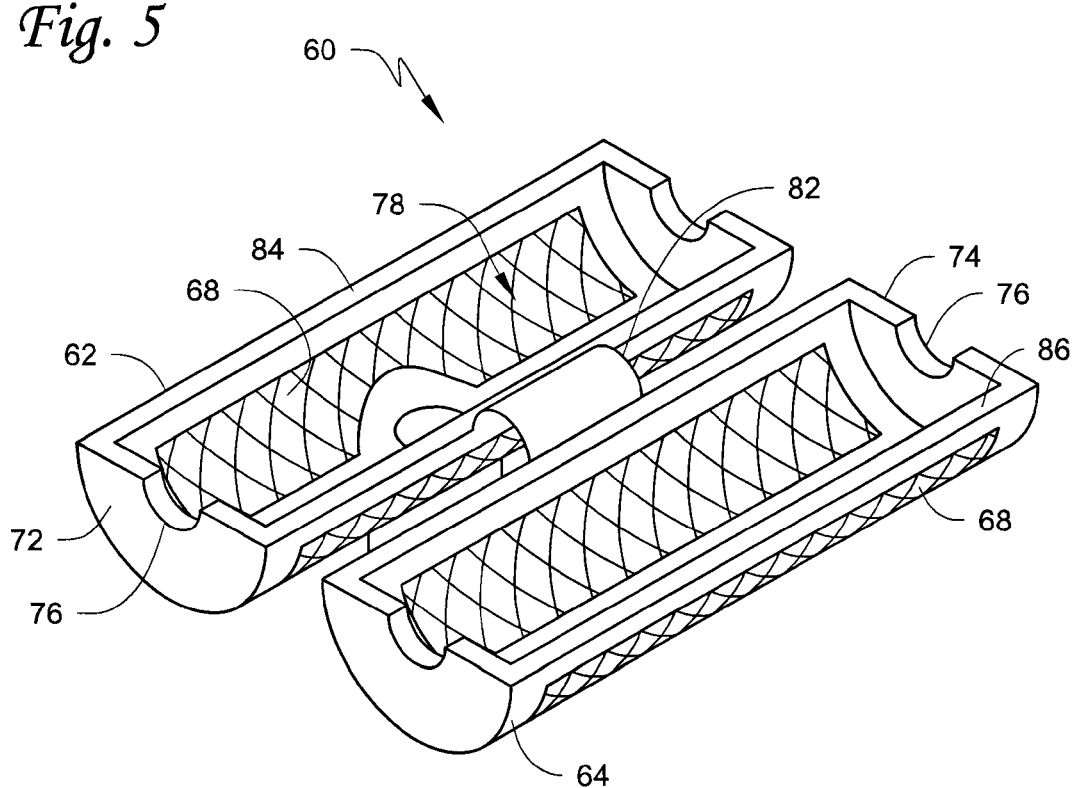
FIG. 5 illustrates a perspective view of a suction filter in an open position that provides a heat transfer pathway therein.
Figure 6:
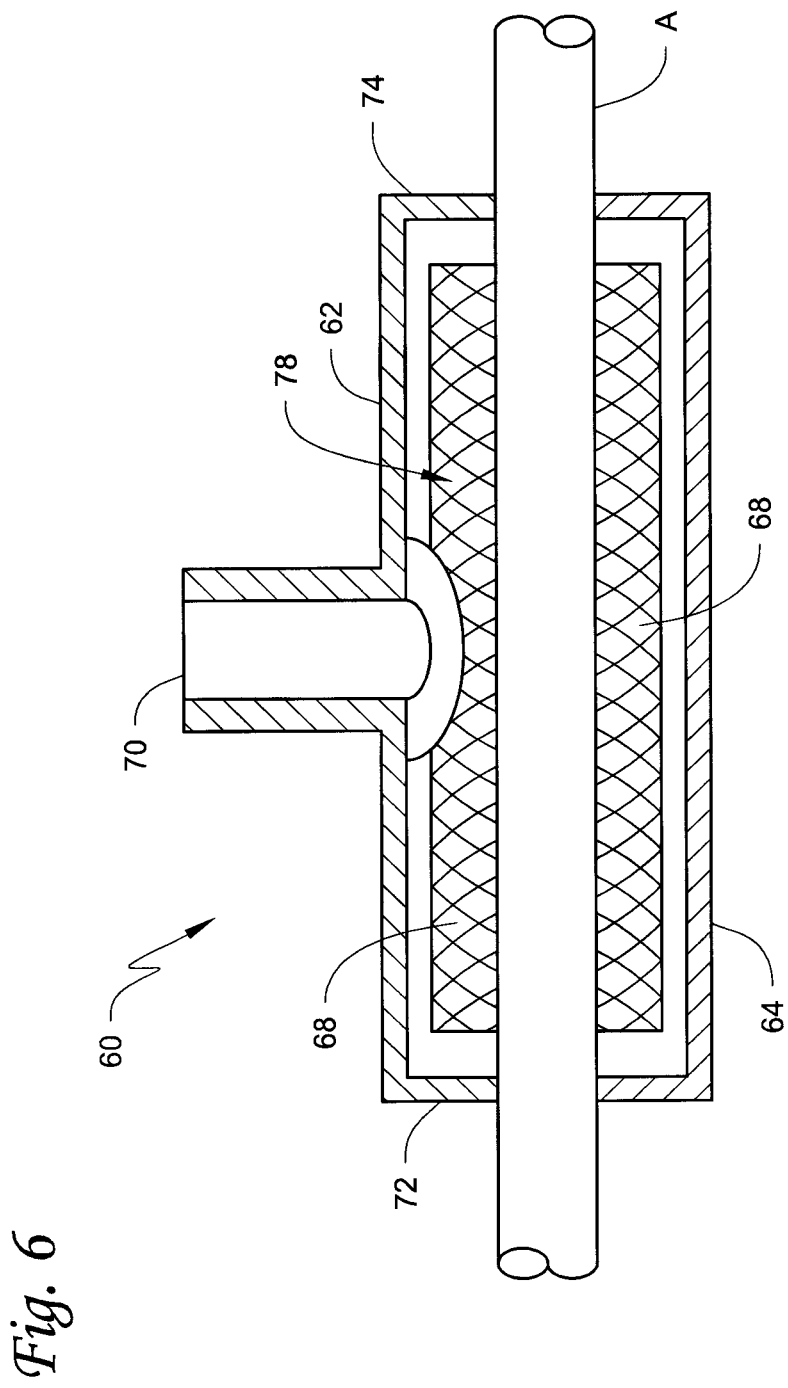
FIG. 6 illustrates a sectional side view of a suction filter in a closed position that provides a heat transfer pathway therein.

Also, as shown in FIG. 5, the first housing portion 62 is attached to the second housing portion 64 via a hinge 82.

When assembling the suction filter 60 to fit around the heater unit A inside a fuel tank, an opposing end 84 of the first housing portion 62 and an opposing end 86 of the second housing portion 64 can be attached using a clipping mechanism or the like. Thus, the heater unit A effectively becomes a thermally conductive element for the suction filter 60. In some embodiments, the interior cavity 78 can also include other thermally conductive elements that are attached to an interior surface of the first housing portion 62 and/or the second housing portion 64 and configured to be in contact with the heater unit A to improve the thermal conduction of heat throughout the interior cavity 78 of the suction filter 60.

Figure 7:
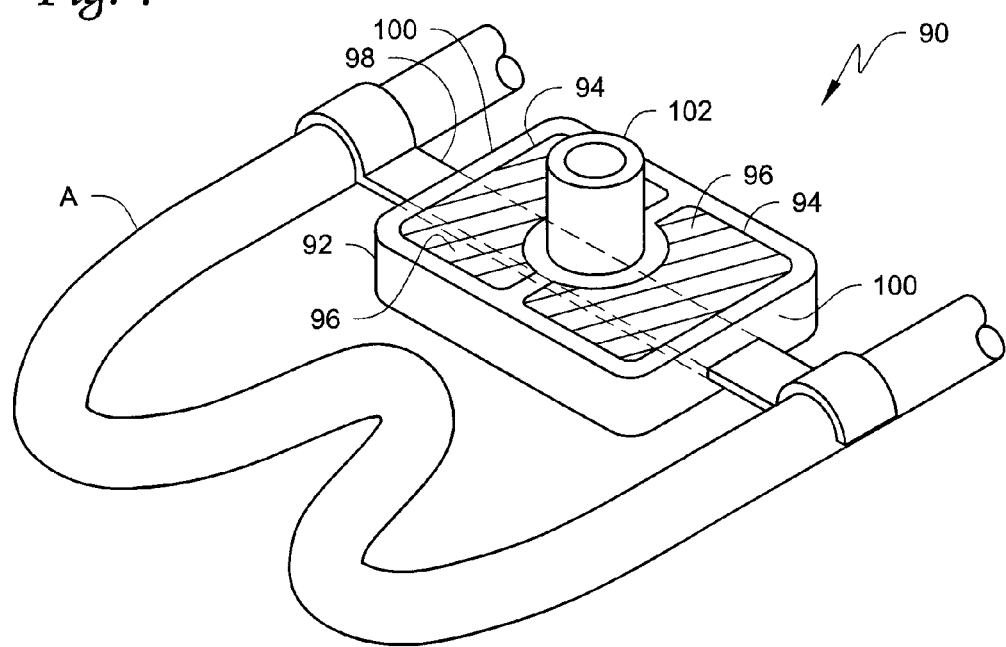
FIG. 7 illustrates a perspective view of a suction filter that provides a heat transfer pathway therein according to another embodiment.

FIG. 7 illustrates a perspective view of yet another embodiment of a suction filter 90 providing a heat transfer pathway therein. The suction filter 90 includes a housing portion 92 that includes openings 94 covered with depth filter media 96, a thermally conductive element 98 passing through an interior cavity 104 (shown in FIG. 8) and projecting out from opposing ends 100 of the housing portion 92. The housing portion 92 defines a support structure of the suction filter 90. The suction filter 90 also includes an inlet 102. The ends of thermally conductive element 98 are configured to removably fit or attach onto a heater unit A. In one embodiment, the ends of the thermally conductive element 98 are configured to pinch the heater unit A. Also, in some embodiments, the thermally conductive element 98 projects out of only one of the opposing ends 100 of the housing portion 92.

The interior cavity 104 is configured for storing fluid filtered by the depth filter media 96 and for allowing the thermally conductive element 98 to pass through the suction filter 90. The thermally conductive element 98 has a ribbon-like shape in the interior cavity 104 to improve the thermal conduction of heat throughout the interior cavity 104.

Figure 8:
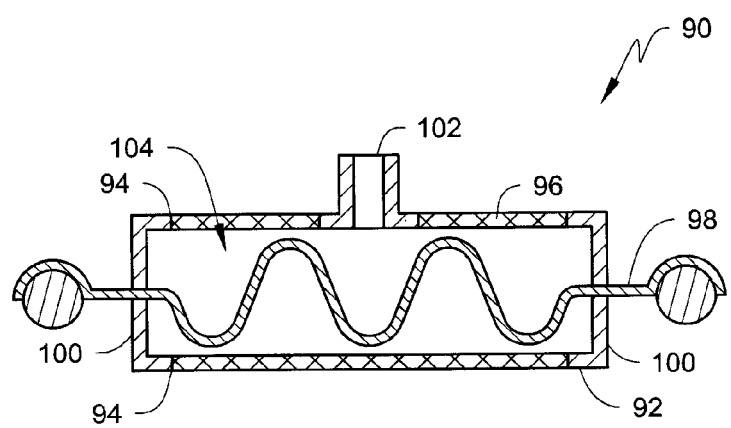
FIG. 8 illustrates a sectional side view of a suction filter that provides a heat transfer pathway therein.
Figure 9:
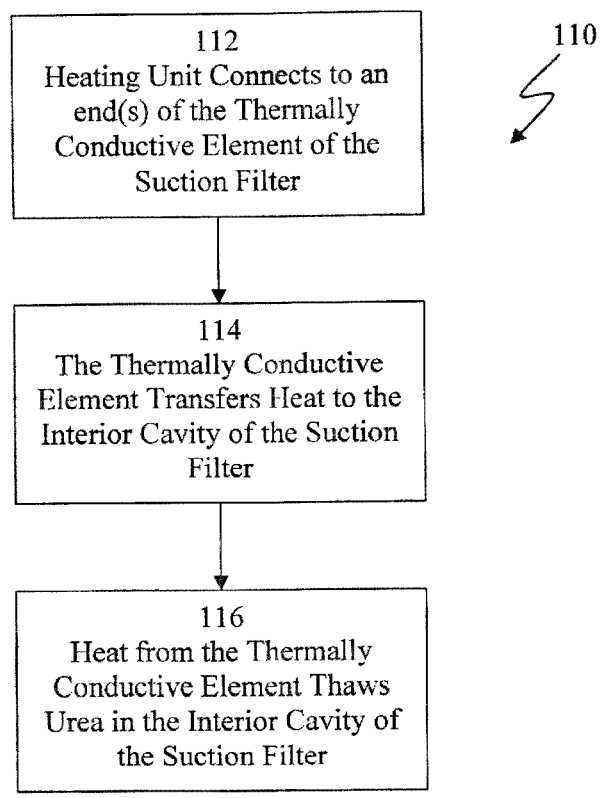
FIG. 9 illustrates a flow chart of how a suction filter thermally transfers heat from outside the suction filter to the interior of the suction filter, according to another embodiment.

FIG. 9 illustrates a flow chart 110 of one embodiment of how a suction filter similar to the suction filter 90 shown in FIGS. 7 and 8 thermally transfers heat from outside the suction filter to the interior of the suction filter. The flowchart 110 begins at step 112 whereby a heating unit located inside the fuel tank is connected to the suction filter via a thermally conductive element that passes through an interior cavity of the suction filter.

At step 114, while the heater unit provides heat for the urea stored in the fuel tank, the heater unit also provides heat along the entire portion of the thermally conductive element, thereby transferring heat to the interior cavity of the suction filter.

At step 116, heat transferred to the thermally conductive element thaws urea located in the interior cavity of the suction filter.

In some embodiments, the thermally conductive elements 20, 40 and 98 are made from a thermally conductive plastic or metallic material that contains heat-conductive additives of graphite such as, for example, carbon fibers, carbon particles, ceramic, metallic fillers, et. . . . In other embodiments the thermally conductive elements 20, 40 and 98 are formed with other thermally conductive materials.

Thus, the thermal conductivity of the thermally conductive elements 20, 40 and 98 can vary significantly based on the materials used. For example, some unfilled thermoplastics have a thermal conductivity as low as 0.2 W/mK and some filled thermoplastics filled with extrusion-grade aluminum alloys having a thermal conductivity of up to 150 W/mK. Typically, most thermally conductive plastic compounds have a thermal conductivity in the range of 1-10 W/mK and most die-cast metal alloys are in the 50-100 W/mK range.

Accordingly, any number of thermally conductive plastic or metallic materials may be used for the thermally conductive elements 20, 40 and 98 depending on, for example, the thermal conductivity required, the structural quality of the material, and the cost of the material. For example, in some embodiments the thermally conductive elements 20, 40 and 98 are formed using a lower cost material such as ceramic or metal additives to provide thermal conductivity up to 2 W/mK. In other embodiments, the thermally conductive elements 20, 40 and 98 are formed using a high performance material such as a carbon fiber to achieve thermal conductivities up to 10 W/mK. Also, in some other embodiments, the thermally conductive elements 20, 40 and 98 include nylon 6 and 66, Polypropylene ("PP") and Polyphenylene Sulfide ("PPS") that, depending on the resin type and filler, have thermal conductivities up to 60 W/mK. Further, in yet some other embodiments, the thermally conductive elements 20, 40 and 98 are formed using an extrusion-grade aluminum alloy to provide thermal conductivity near 150 W/mK.

The above examples of materials used for the thermally conductive elements 20, 40 and 98 are merely several exemplary examples that may be used, and in other embodiments other materials may be used that provide effective thermal conduction to an interior cavity of a suction filter. Also, filled thermoplastics filled with thermally conductive materials such as ceramic, metallic fillers, carbon particles, carbon fibers, etc. can also used to reduce electric consumption by the heating system.

The invention may be embodied in other forms without departing from the spirit or novel characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

The invention claimed is:

1. An in-tank suction filter providing a heat transfer pathway therein, comprising:
    a support structure;
    an inlet connected to the support structure and configured to connect to a fuel pump;
    a filter media separate from and connected to the support structure that filters a fluid as it passes through the filter media into an interior portion of the suction filter;
    the support structure and filter media together defining an exterior surface exposed to the fluid; and
    an inside surface defining the interior portion of the suction filter, wherein the support structure is configured to allow a thermally conductive element to enter the interior portion, and the thermally conductive element transfers sufficient heat obtained external the suction filter to the interior portion of the suction filter to thaw frozen fluid in the interior portion of the suction filter.

2. The suction filter of claim 1, wherein the thermally conductive element comprises an appendage portion that extends out of the suction filter and a rib portion located at the interior portion of the suction filter providing a heat transfer pathway into the interior portion.

3. The suction filter of claim 1, wherein a portion of the support structure is surrounded by the filter media.

4. The suction filter of claim 1, wherein an interior cavity of the support structure defines the interior portion, and the support structure includes an opening to the interior cavity filled by the filter media.

5. The suction filter of claim 4, wherein the thermally conductive element passes entirely through the interior cavity of the support structure.

6. The suction filter of claim 5, wherein the thermally conductive element includes an end located external the support structure, the end configured to removably attach onto a heater unit.

7. The suction filter of claim 5, wherein the thermally conductive element forms a ribbon-like shape in the interior cavity of the support structure.

8. The suction filter of claim 1, wherein the thermally conductive element is a thermally conductive plastic.

9. The suction filter of claim 1, wherein the thermally conductive element is a thermally conductive metal.

10. The suction filter of claim 1, wherein the thermally conductive element contains heat-conductive additives including one or more of: ceramic, carbon fibers, carbon particles, and metallic fillers.

11. The suction filter of claim 1, wherein the thermally conductive element includes one or more of nylon, polypropylene, or polyphenylene sulfide.

12. The suction filter of claim 1, wherein the thermally conductive element includes an extrusion-grade aluminum alloy.

13. The suction filter of claim 1, wherein the filter media is a depth filter media.

14. An in-tank suction filter providing a heat transfer pathway therein, comprising:
    a support structure;
    an inlet connected to the support structure and configured to connect to a fuel pump;
    a filter media connected to the support structure that filters a fluid as it passes through the filter media into an interior portion of the suction filter;
    the support structure and filter media together defining an exterior surface exposed to the fluid; and
    the support structure defining a thermally conductive element extending from the exterior surface to the interior portion and thermally__ communicates the exterior surface to the interior portion of the suction filter, wherein the thermally conductive element is structured to transfer sufficient heat obtained external the suction filter to the interior portion of the suction filter to thaw frozen fluid in the interior portion of the suction filter.

15. The suction filter of claim 1, wherein the support structure itself defines the thermally conductive element, the support structure including an exterior portion in thermal communication with an external heat source.

16. The suction filter of claim 1, wherein the interior portion of the suction filter does not include a heat source.

17. The suction filter of claim 1, wherein the thermally conductive element has a thermal conductivity greater than or equal to 1 W/mK.

* * * * *